(12) United States Patent
Zhou et al.

(10) Patent No.: US 11,587,728 B2
(45) Date of Patent: Feb. 21, 2023

(54) ASSEMBLY PROCESS OF HALBACH MAGNETIC RING COMPONENT

(71) Applicant: Baotou INST Magnetic New Materials Co., Ltd., Inner Mongolia (CN)

(72) Inventors: Baoping Zhou, Baotou (CN); Qingsong Wu, Baotou (CN); Zejiang Li, Baotou (CN)

(73) Assignee: BAOTOU INST MAGNETIC NEW MATERIALS CO., LTD., Baotou (CN)

( * ) Notice: Subject to any disclaimer, the term of this patent is extended or adjusted under 35 U.S.C. 154(b) by 143 days.

(21) Appl. No.: 17/161,306

(22) Filed: Jan. 28, 2021

(65) Prior Publication Data

US 2022/0068559 A1 Mar. 3, 2022

(30) Foreign Application Priority Data

Aug. 27, 2020 (CN) .......................... 202010875502.4

(51) Int. Cl.
*H01F 7/06* (2006.01)
*H01F 41/02* (2006.01)
*H01F 7/02* (2006.01)

(52) U.S. Cl.
CPC ........... *H01F 41/0253* (2013.01); *H01F 7/02* (2013.01)

(58) Field of Classification Search
CPC ....... H02K 15/03; H01F 7/021; H01F 7/0221; H01F 41/0253
See application file for complete search history.

(56) References Cited

U.S. PATENT DOCUMENTS

| | | | |
|---|---|---|---|
| 6,841,910 B2* | 1/2005 | Gery | H02K 49/106 310/156.43 |
| 8,638,016 B2* | 1/2014 | Fullerton | H02K 21/24 310/156.43 |
| 9,330,825 B2* | 5/2016 | Sarai | H01F 7/02 |
| 2018/0313920 A1* | 11/2018 | Sotgiu | G01R 33/383 |

* cited by examiner

*Primary Examiner* — Paul D Kim
(74) *Attorney, Agent, or Firm* — Bay State IP, LLC (57) ABSTRACT

An assembly process of a Halbach magnetic ring component, including an adsorbing each magnetic shoe on the outer surface of a positioning cylinder; sleeving the sleeve on the outer surface of a circular ring; moving the sleeve downwards so that the upper part of each magnetic shoe is exposed; performing first dispensing on the exposed part of the upper part of each magnetic shoe; sleeving the aluminum ring on the outer surface of the exposed part of the upper part of each magnetic shoe, so that the aluminum ring covers the first dispensing area of each magnetic shoe; moving the sleeve downwards until the sleeve is completely separated from the magnetic shoe, and performing second dispensing on the lower region of each magnetic shoe; moving the aluminum ring downwards until the aluminum ring is completely sleeved on the outer surface of each magnetic shoe.

10 Claims, 7 Drawing Sheets

```
┌─────────────────────────────────────────────────────────────┐
│ sequentially adsorbing each magnetic shoe on the outer      │
│ surface of the low carbon steel positioning cylinder in the │
│ form of a Halbach magnetic circuit array                    │
└─────────────────────────────────────────────────────────────┘
                              ▽
┌─────────────────────────────────────────────────────────────┐
│ checking whether each magnetic shoe is correct              │
└─────────────────────────────────────────────────────────────┘
                              ▽
┌─────────────────────────────────────────────────────────────┐
│ sleeving a sleeve on the outer surface of the circular ring │
│ formed by each magnetic shoe                                │
└─────────────────────────────────────────────────────────────┘
                              ▽
┌─────────────────────────────────────────────────────────────┐
│ moving the sleeve downwards so that the upper part of each  │
│ magnetic shoe is exposed                                    │
└─────────────────────────────────────────────────────────────┘
                              ▽
┌─────────────────────────────────────────────────────────────┐
│ performing first dispensing on the exposed part of the      │
│ upper part of each magnetic shoe                            │
└─────────────────────────────────────────────────────────────┘
                              ▽
┌─────────────────────────────────────────────────────────────┐
│ sleeving the aluminum ring on the upper area of each        │
│ magnetic shoe during the first dispensing, so that the      │
│ aluminum ring covers the first dispensing area of each      │
│ magnetic shoe                                               │
└─────────────────────────────────────────────────────────────┘
                              ▽
┌─────────────────────────────────────────────────────────────┐
│ continuing to move the sleeve downwards until the sleeve is │
│ completely separated from the magnetic shoe                 │
└─────────────────────────────────────────────────────────────┘
                              ▽
┌─────────────────────────────────────────────────────────────┐
│ performing second dispensing on the remaining exposing area │
│ of the lower part of the magnetic shoe                      │
└─────────────────────────────────────────────────────────────┘
                              ▽
┌─────────────────────────────────────────────────────────────┐
│ moving the aluminum ring downwards until the aluminum ring  │
│ is completely sleeved on the outer surface of the magnetic  │
│ shoe                                                        │
└─────────────────────────────────────────────────────────────┘
                              ▽
┌─────────────────────────────────────────────────────────────┐
│ standing for 24 hours until the glue is completely cured    │
└─────────────────────────────────────────────────────────────┘
                              ▽
┌─────────────────────────────────────────────────────────────┐
│ placing the low carbon steel positioning cylinder and the   │
│ Halbach magnetic ring component on an extrusion table 6,    │
│ and applying a vertical downward force to the low carbon    │
│ steel positioning cylinder from the upper end of the low    │
│ carbon steel positioning cylinder until the low carbon      │
│ steel position cylinder is pushed out                       │
└─────────────────────────────────────────────────────────────┘
                              ▽
┌─────────────────────────────────────────────────────────────┐
│ removing the residual glue, and checking whether the        │
│ polarity of magnet is correct and whether the dimensional   │
│ tolerance is in conformity                                  │
└─────────────────────────────────────────────────────────────┘
```

ASSEMBLY PROCESS OF HALBACH MAGNETIC RING COMPONENT

CROSS REFERENCE TO RELATED APPLICATION

This application claims the benefit of and takes priority from Chinese Patent Application No. 202010875502.4 filed on Aug. 27, 2020, the contents of which are herein incorporated by reference.

TECHNICAL FIELD

The present disclosure relates to the technical field of Halbach magnetic ring components, in particular to an assembly process of a Halbach magnetic ring component.

BACKGROUND

Halbach Array (Halbach permanent magnet) is a magnet structure. In 1979, when Klaus Halbach, an American scholar, made an electronic acceleration experiment, he discovered and gradually improved this special permanent magnet structure, and finally formed the so-called "Halbach" magnet, which is an approximate ideal structure in engineering. The Halbach array uses the arrangement of special magnet units to enhance the field strength in unit direction, with the goal of generating the strongest magnetic field with the least number of magnets. This array is completely made of rare earth permanent magnet material. By arranging permanent magnets in different magnetizing directions according to a certain rule, the magnetic lines of force can be gathered on one side of the magnet, and weakened on the other side, thus obtaining an ideal unilateral magnetic field. This is of great significance in engineering. Among the permanent magnet motors, the permanent magnet motor with the Halbach array structure has an air gap magnetic field closer to sinusoidal distribution than the traditional permanent magnet motor. Under the same amount of permanent magnet material, the Halbach permanent magnet motor has the advantages of higher air gap magnetic density and smaller magnetic loss.

Due to its special polarity arrangement, some magnets repel each other in the assembly process, which increases the manufacturing difficulty. With the increase of the number of magnets, the assembly difficulty will increase correspondingly. The conventional assembly method is suitable for the assembly of a linear Halbach magnet component, but not for the assembly of a circular Halbach component. At present, the assembly method of the circular Halbach assembly is that the magnetic shoes are placed one by one in the inner ring of the aluminum ring. Because the aluminum ring is not magnetically conductive, the magnetic shoes repel each other, the magnetic shoes are not closely arranged, and the magnetic shoes are easily reversed due to the repulsive magnetic force in the assembly process, which affects the working efficiency and the precision of the finished product. The qualified rate is low. Therefore, how to solve the problems that the magnetic shoe is not closely arranged, easy to reverse, low in assembly efficiency, low in finished product accuracy and low in qualified rate due to the lack of supports adsorbing the magnetic shoe when the Halbach magnetic ring is assembled has become a technical problem urgently needed to be solved by those skilled in the art.

SUMMARY

The purpose of the present disclosure is to provide an assembly process of a Halbeck magnetic ring component to solve the problems in the prior art that the magnetic shoe is not closely arranged, easy to reverse, low in assembly efficiency, low in finished product accuracy and low in qualified rate due to the lack of supports adsorbing the magnetic shoe when the Halbach magnetic ring is assembled. Many technical effects produced by the preferred technical scheme among the technical schemes according to the present disclosure are described in detail hereinafter.

The present disclosure provides an assembly process of a Halbach magnetic ring component, comprising:

sequentially adsorbing a plurality of magnetic shoes marked with polarity directions on the outer surface of the positioning cylinder, wherein each magnetic shoe is adsorbed on the outer surface of the positioning cylinder in the form of a Halbach magnetic circuit array and forms a circular ring;

sleeving a sleeve on the outer surface of the circular ring formed by each magnetic shoe so as to fasten each magnetic shoe;

moving the sleeve downwards so that the upper part of each magnetic shoe is exposed;

performing first dispensing on the exposed part of the upper part of each magnetic shoe;

sleeving the aluminum ring on the outer surface of the upper part of the circular ring formed by each magnetic shoe, so that the aluminum ring covers the first dispensing area of each magnetic shoe, and the upper end face of the aluminum ring is higher than that of the magnetic shoe;

moving the sleeve downwards until the sleeve is completely separated from the magnetic shoe, and performing second dispensing on the exposed part of the lower part of each magnetic shoe;

moving the aluminum ring downwards until the aluminum ring is completely sleeved on the outer surface of each magnetic shoe, wherein the upper end face of the aluminum ring is flush with the upper end face of the magnetic shoe, and the low end face of the aluminum ring is flush with the lower end face of the magnetic shoe to obtain a preliminarily formed Halbach magnetic ring component; and taking out a positioning cylinder to obtain the cured Halbach magnetic ring component.

Preferably, when each magnetic shoe is adsorbed on the outer surface of the positioning cylinder, a stainless steel positioning plate is used to ensure that the length direction of the magnetic shoe is consistent with the axial direction of the positioning cylinder, the stainless steel positioning plate has an arc structure and an inner diameter matched with the outer diameter of the positioning cylinder, the stainless steel positioning plate comprises a reference surface, when the stainless steel positioning plate is attached to the outer surface of the positioning cylinder, the length extension direction of the reference surface is consistent with the axial direction of the positioning cylinder, and the stainless steel positioning plate is attached to the positioning cylinder so that the magnetic shoe is adsorbed on the positioning cylinder against the reference surface.

Preferably, prior to the first dispensing, the sleeve moves downwards until the upper end face of the sleeve is located in the middle of the magnetic shoe, and then the first dispensing is performed on the exposed part of the upper part of each magnetic shoe; before the glue of the first dispensing is cured, the second dispensing is performed on the exposed part of the lower part of each magnetic shoe.

Preferably, prior to taking out the positioning cylinder, the preliminarily formed Halbach magnetic ring component is allowed to stand for 24 hours, and the positioning cylinder is taken out after the dispensing glue is completely cured, so that the positioning cylinder is separated from the Halbach magnetic ring component.

Preferably, when the positioning cylinder is taken out, the positioning cylinder and the preliminarily formed Halbach magnetic ring component are placed on an extrusion table, and an external force is applied to the upper end of the positioning cylinder to push out the positioning cylinder.

Preferably, the positioning cylinder is made of low carbon steel.

Preferably, the sleeve is a POM sleeve.

Preferably, the glue used for dispensing is anaerobic structural adhesive.

Preferably, the number of the magnetic shoes is 104, and the magnetic shoe is a sintered NdFeB magnetic shoe.

Preferably, the outer diameter of the positioning cylinder is the same as the inner diameter of the Halbach magnetic ring component, and the inner diameter of the sleeve is matched with the outer diameter of the magnetic shoe.

According to the technical scheme according to the present disclosure, the assembly process of a Halbach magnetic ring component comprises: sequentially adsorbing a plurality of magnetic shoes marked with polarity directions on the outer surface of the positioning cylinder, wherein each magnetic shoe is adsorbed on the outer surface of the positioning cylinder in the form of a Halbach magnetic circuit array and forms a circular ring; sleeving a sleeve on the outer surface of the circular ring formed by each magnetic shoe so as to fasten each magnetic shoe; moving the sleeve downwards so that the upper part of each magnetic shoe is exposed; performing first dispensing on the exposed part of the upper part of each magnetic shoe; sleeving the aluminum ring on the outer surface of the upper part of the circular ring formed by each magnetic shoe, so that the aluminum ring covers the first dispensing area of each magnetic shoe, and the upper end face of the aluminum ring is higher than that of the magnetic shoe; moving the sleeve downwards until the sleeve is completely separated from the magnetic shoe, and performing second dispensing on the exposed part of the lower part of each magnetic shoe; moving the aluminum ring downwards until the aluminum ring is completely sleeved on the outer surface of each magnetic shoe to obtain a preliminarily formed Halbach magnetic ring component; and taking out a positioning cylinder to obtain the cured Halbach magnetic ring component.

In this manner, the magnetic shoe can be adsorbed on the positioning cylinder, so as to prevent the magnetic shoe from reversing due to the factor of repelling magnetic force in the assembly process, and play a role in fixing the magnetic shoe and ensuring the magnetic shoe to be closely arranged; before the aluminum ring is sleeved on the outer surface of the magnetic shoe, the sleeve is sleeved on the outer surface of the magnetic shoe to further fasten the magnetic shoe, which solves the problems that the magnetic shoe is not closely arranged, easy to reverse, low in assembly efficiency, low in finished product accuracy and low in qualified rate due to the lack of supports adsorbing the magnetic shoe when the Halbach magnetic ring is assembled.

BRIEF DESCRIPTION OF THE DRAWINGS

In order to explain the embodiments of the present disclosure or the technical scheme in the prior art more clearly, the drawings required in the embodiments or the description of the prior art will be briefly introduced hereinafter. Obviously, the drawings in the following description are only some embodiments of the present disclosure, and other drawings can be obtained according to these drawings for those skilled in the art without paying creative labor.

FIG. 1 is a flow chart of an assembly process of a Halbach magnetic ring component according to an embodiment of the present disclosure;

In the FIGS. 1-12:

1. Magnetic shoe; 2. Aluminum ring; 3. Positioning cylinder; 4. Sleeve; 5. Stainless steel positioning plate; 51. Reference surface; 6. Extrusion table; 7. First dispensing area; 8. Second dispensing area.

DESCRIPTION OF THE EMBODIMENTS

In order to make the purpose, technical scheme and advantages of the present disclosure clearer, the technical scheme of the present disclosure will be described in detail hereinafter. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

The purpose of this embodiment is to provide an assembly process of the Halbach magnetic ring component, which solves the problems that the magnetic shoe is not closely arranged, easy to reverse, low in assembly efficiency, low in finished product accuracy and low in qualified rate due to the lack of supports adsorbing the magnetic shoe when the Halbach magnetic ring is assembled.

Hereinafter, embodiments will be described with reference to the drawings. In addition, the embodiments shown below do not play any role in limiting the summary described in the claims. In addition, the entire contents of the structures represented by the following embodiments are not limited to the solutions necessary for the present disclosure described in the claims.

With reference to FIGS. 1-8, in this embodiment, an assembly process of the Halbach magnetic ring component comprises a positioning cylinder 3 and a sleeve 4 in the assembly process.

Figure 2:
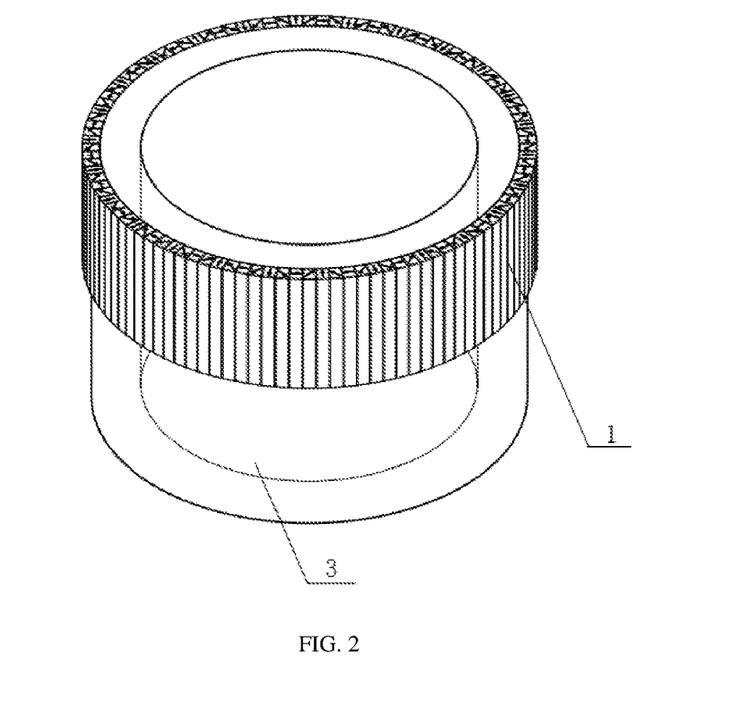
FIG. 2 is a structural diagram of a magnetic shoe adsorbed on a positioning cylinder according to an embodiment of the present disclosure.

Step 1, as shown in FIG. 2, a plurality of magnetic shoes 1 marked with polarity directions are sequentially adsorbed on the outer surface of the positioning cylinder 3, wherein each magnetic shoe 1 is adsorbed on the outer surface of the positioning cylinder 3 in the form of a Halbach magnetic circuit array and forms a circular ring. Two side surfaces of any one magnetic shoe 1 are attached to the side surfaces of two adjacent magnetic shoes 1, that is, each magnetic shoe 1 can form a circular ring structure after being adsorbed on the positioning cylinder 3. Specifically, the magnetic shoes 1 are sintered NdFeB magnetic shoes, the number of which is 104; the positioning cylinder 3 is made of low carbon steel. Of course, in other embodiments, the positioning cylinder 3 can be made of other materials that can absorb the magnetic shoe 1. The outer diameter of the positioning cylinder 3 is the same as the inner diameter of the Halbach magnetic ring component.

Figure 3:
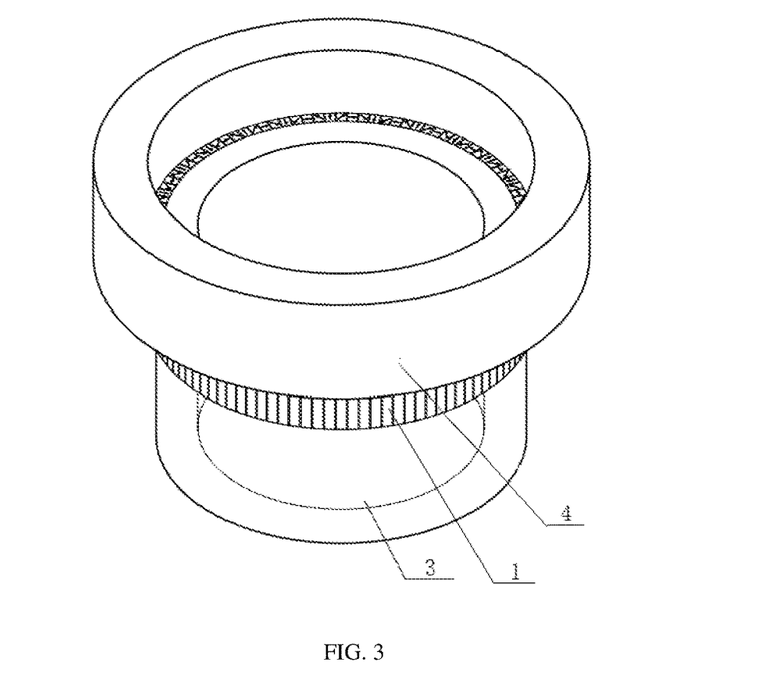
FIG. 3 is a structural schematic diagram when a sleeve starts to be sleeved according to an embodiment of the present disclosure.
Figure 4:
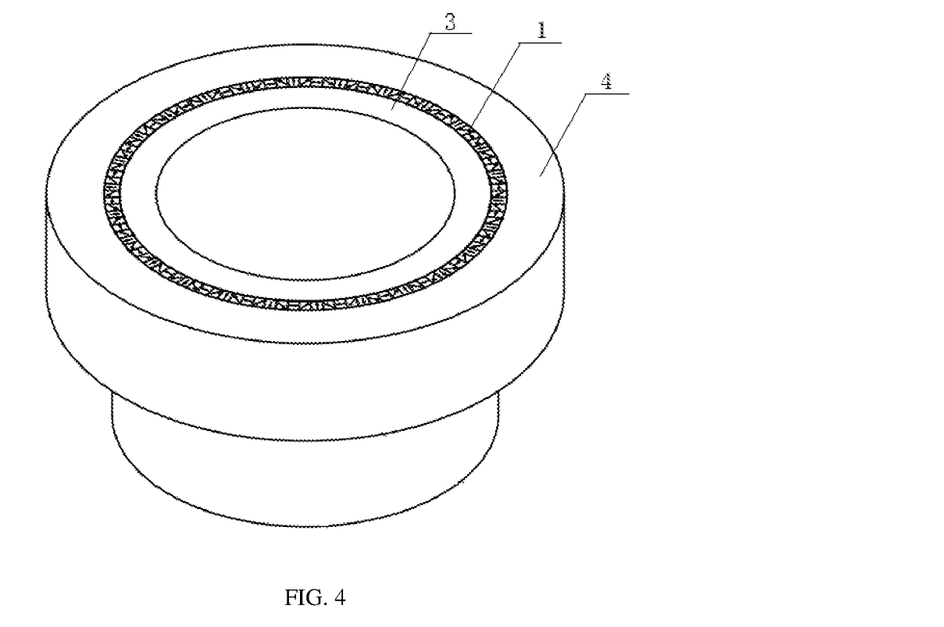
FIG. 4 is a structural schematic diagram when a sleeve is completely sleeved on each magnetic shoe according to an embodiment of the present disclosure.

Step 2, as shown in FIG. 3 and FIG. 4, a sleeve 4 is sleeved on the outer surface of the circular ring formed by each magnetic shoe 1 in the form of a Halbach magnetic circuit array so as to fasten each magnetic shoe 1. Specifically, the inner diameter of the sleeve 4 is matched with the outer diameter of the magnetic shoe 1.

Figure 5:
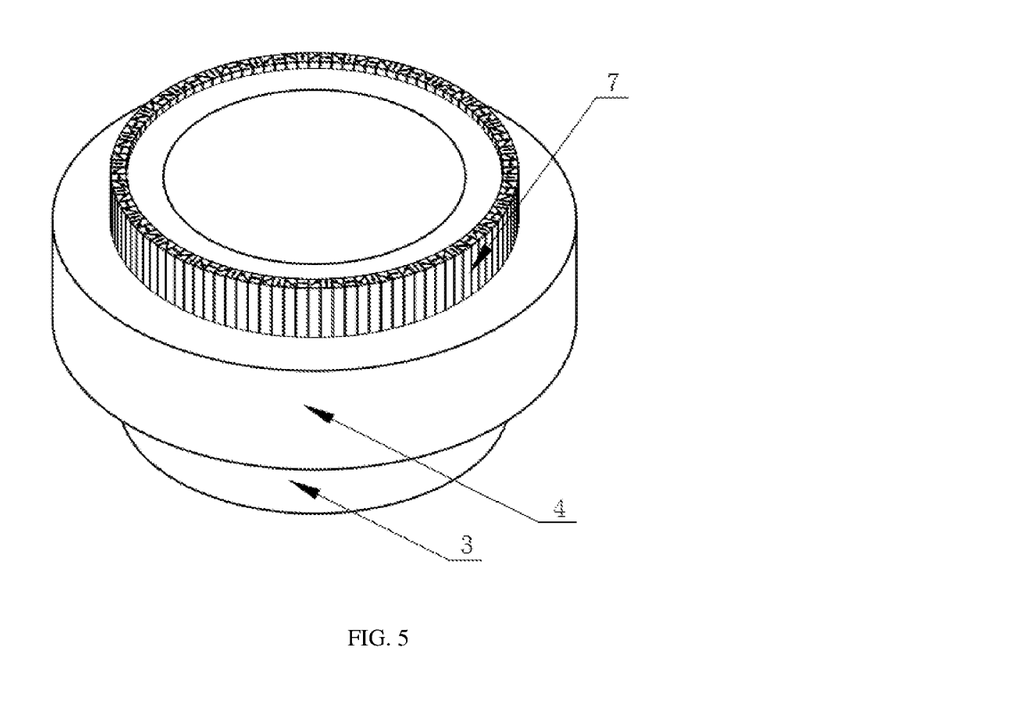
FIG. 5 is a structural schematic diagram of the first dispensing according to an embodiment of the present disclosure.

Step 3, as shown in FIG. 5, the sleeve 4 is moved downwards so that the upper part of each magnetic shoe 1 is exposed.

Step 4, as shown in FIG. 5, the first dispensing is performed on the exposed part of the upper part of each magnetic shoe 1. The exposing part of each magnetic shoe 1 is evenly dispensed.

Figure 6:
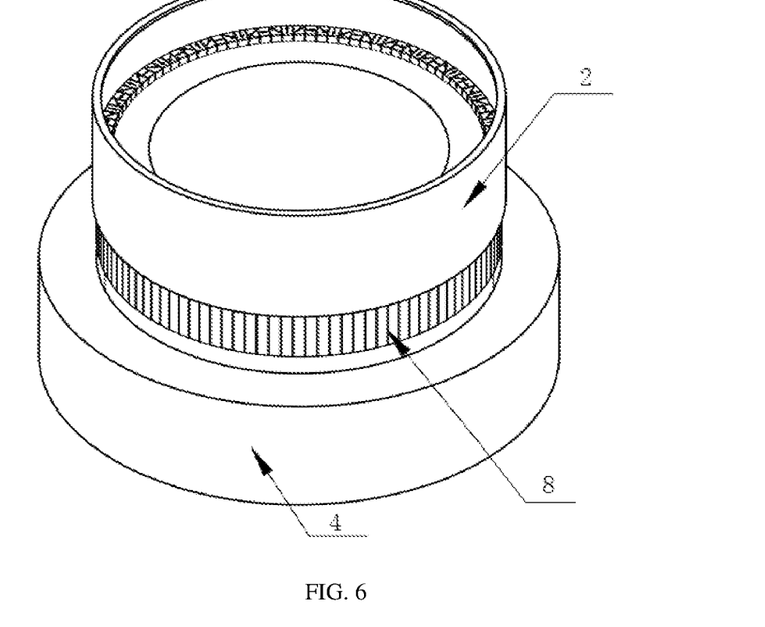
FIG. 6 is a structural schematic diagram of the second dispensing according to an embodiment of the present disclosure.

Step 5, as shown in FIG. 6, the aluminum ring 2 is sleeved on the outer surface of the exposed part of the upper part of the magnetic shoe 1. Specifically, the aluminum ring 2 is sleeved on the outer surface of the magnetic shoe 1 from top to bottom until the aluminum ring 2 covers the first dispensing area 7. In the vertical direction, the upper end face of the aluminum ring 2 is higher than the upper end face of the magnetic shoe 1, and the lower end face of the aluminum ring 2 is higher than the lower end face of the magnetic shoe 1.

Step 6, the sleeve 4 is moved downwards until the sleeve 4 is completely separated from the magnetic shoe 1, and the second dispensing is performed on the exposed part of the lower part of each magnetic shoe 1. Specifically, the glue the glue used for the first dispensing and the second dispensing is anaerobic structural adhesive.

Figure 7:
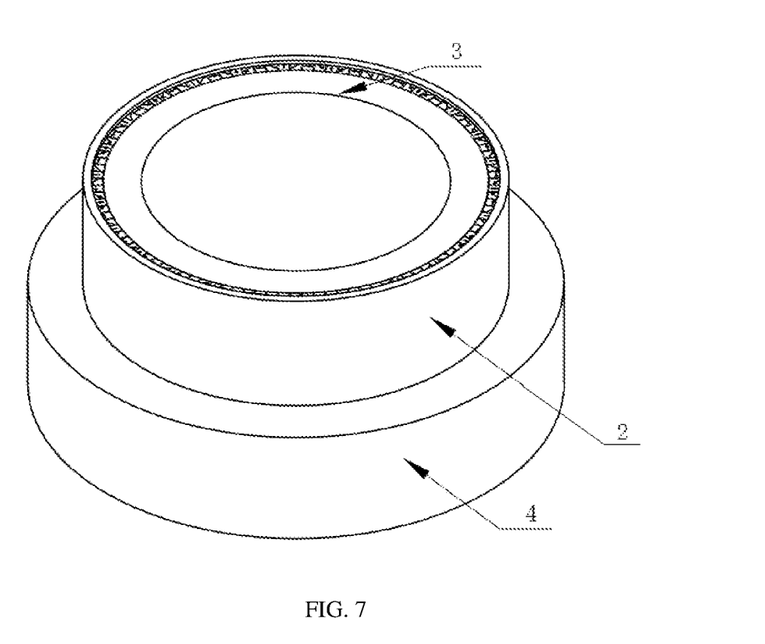
FIG. 7 is a structural schematic diagram when an aluminum ring is completely sleeved on each magnetic shoe according to an embodiment of the present disclosure.

Step 7, as shown in FIG. 7, the aluminum ring 2 is moved downwards until the aluminum ring 2 is completely sleeved on the outer surface of each magnetic shoe 1, wherein the upper end face of the aluminum ring 2 is flush with the upper end face of the magnetic shoe 1, and the low end face of the aluminum ring 2 is flush with the lower end face of the magnetic shoe 1 to obtain a preliminarily formed Halbach magnetic ring component.

Step 8, a positioning cylinder 3 is taken out to obtain the cured Halbach magnetic ring component.

In this manner, the magnetic shoe 1 is adsorbed on the positioning cylinder 3, and there will be no repulsion between the magnetic shoes 1, which can prevent the magnetic shoe from reversing due to the factor of repelling magnetic force in the assembly process so as to affect the working efficiency and the precision of finished products. In this way, it not only can play a role in fixing the magnetic shoe 1 and ensuring the magnetic shoe to be closely arranged 1, but also can ensure the inner diameter precision of the Halbach magnetic ring component by the precision of the positioning cylinder 3. After all the magnetic shoes 1 are adsorbed on the positioning cylinder 3, the sleeve 4 is sleeved outside the magnetic shoes 1, and the sleeve 4 is moved downwards to expose the upper part of the magnetic shoes 1. Dispensing is performed on the upper part of the magnetic shoes 1, and the aluminum ring 2 is sleeved in the dispensing area of the magnetic shoes 1 to cover the dispensed area, so as to ensure the tight alignment among the magnetic shoes 1. In this way, it not only can further fasten the magnetic shoe 1 by the sleeve 4 and ensure the magnetic shoe 1 bonded to the aluminum ring 2 after dispensing to be closely arranged 1, but also can ensure the outer diameter precision of the magnetic ring formed by a plurality of magnetic shoes 1. The problems are solved that the magnetic shoe 1 is not closely arranged, easy to reverse, low in assembly efficiency, low in finished product accuracy and low in qualified rate due to the lack of supports adsorbing the magnetic shoe 1 when the Halbach magnetic ring is assembled.

In addition, because there are a large number of magnetic shoes 1, assembling according to this process can also check whether the magnetic shoes 1 will eventually have gaps or fail to be assembled due to the factor such as accumulated tolerance in the process that the magnetic shoes 1 is adsorbed on the positioning cylinder 3, and timely supplement the magnetic shoes 1 that can compensate for the size, thus avoiding errors such as large accumulated tolerance, gaps between magnets, wrong polarity and easy deformation.

Preferably, after all the magnetic shoes 1 are arranged and adsorbed on the positioning cylinder 3, it is carefully checked whether the polarity of the magnetic shoes 1 is correct, and then the sleeve 4 is pressed from above the magnetic shoes 1 to fasten the magnetic shoes 1.

Figure 9:
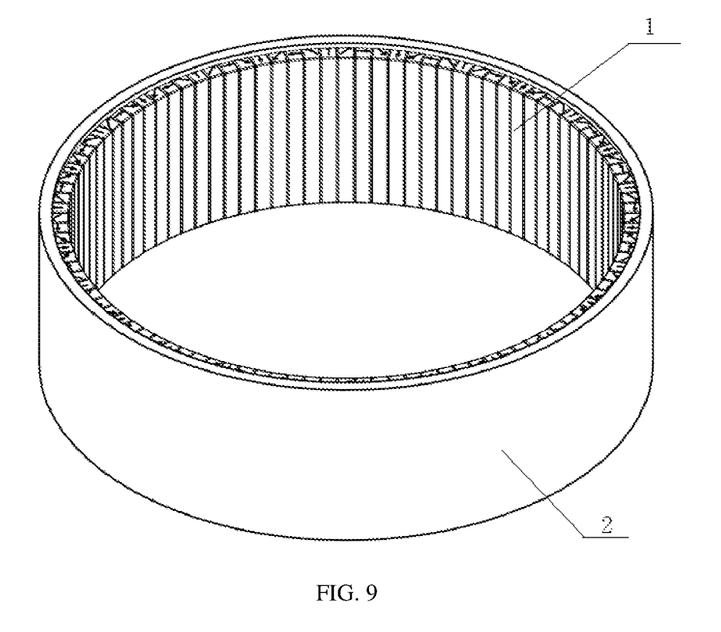
FIG. 9 is a structural schematic diagram of a Halbach magnetic ring component according to an embodiment of the present disclosure.
Figure 12:
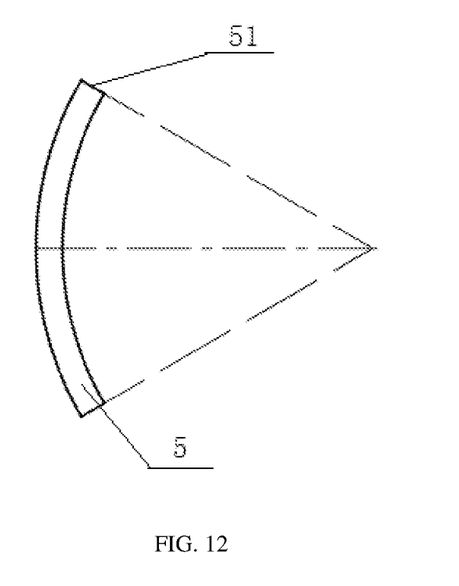
FIG. 12 is a structural schematic diagram of a stainless steel positioning plate.

As a preferred embodiment, when each magnetic shoe 1 is adsorbed on the outer surface of the positioning cylinder 3, the stainless steel positioning plate 5 is used to ensure that the length direction of the magnetic shoe 1 is consistent with the axial direction of the positioning cylinder 3. Specifically, as shown in FIG. 12, the stainless steel positioning plate 5 has an arc structure, and the inner diameter of the stainless steel positioning plate 5 is matched with the outer diameter of the positioning cylinder 3. As shown in FIG. 12, the stainless steel positioning plate 5 comprises a reference surface 51. When the stainless steel positioning plate 5 is attached to the outer surface of the positioning cylinder 3, the length direction of the reference surface 51 is consistent with the axial direction of the positioning cylinder 3, and the stainless steel positioning plate 5 is attached to the positioning cylinder 3 so that the magnetic shoe 1 is adsorbed on the positioning cylinder 3 against the reference surface 51 so as to ensure that the length direction of the magnetic shoe 1 is consistent with the axial direction of the positioning cylinder. It should be noted that the above "length direction" of the magnetic shoe 1 refers to the placed state of the magnetic shoe 1 as shown in FIG. 9, that is, in FIG. 9, the direction from the upper end to the lower end of the magnetic shoe 1 is the "length direction" of the magnetic shoe 1. FIG. 12 is a top view of a stainless steel positioning plate. The above "length direction" of the reference surface 51 refers to the placed state of the stainless steel positioning plate 5 as shown in FIG. 12, that is, the direction perpendicular to the paper surface in FIG. 12 is the "length direction" of the reference surface 51.

In this manner, when the magnetic shoe 1 is adsorbed on the positioning cylinder 3, the stainless steel positioning plate 5 can be attached to the surface of the positioning cylinder 3, and then the side of the magnetic shoe 1 can be attached to the reference surface 51 of the stainless steel positioning plate 5 to be adsorbed on the positioning cylinder 3, thus ensuring that the length direction of the magnetic shoe 1 is consistent with the axial direction of the positioning cylinder 3.

Preferably, prior to the first dispensing, the sleeve 4 moves downwards until the upper end face of the sleeve 4 is located in the middle of the magnetic shoe 1, and then the first dispensing is performed on the exposed part of the upper part of each magnetic shoe 1. Before the glue of the first dispensing is cured, the second dispensing is performed on the exposed part of the lower part of each magnetic shoe 1. Specifically, the interval between pressing the aluminum ring after the first dispensing and pressing the aluminum ring after the second dispensing should not be too long, so as to avoid the anaerobic structural adhesive starting to be cured after the first dispensing. The operations of two dispensing and pressing the aluminum ring 2 should be completed within 5 minutes.

In this manner, when the upper end face of the sleeve 4 is located in the middle of the magnetic shoe 1, the sleeve 4 can play a role in fixing the magnetic shoe 1 when the first dispensing is performed and the aluminum ring 2 is sleeved.

Preferably, prior to taking out the positioning cylinder 3, the preliminarily formed Halbach magnetic ring component is allowed to stand for 24 hours, and the positioning cylinder 3 is taken out after the dispensing glue is completely cured.

Figure 8:
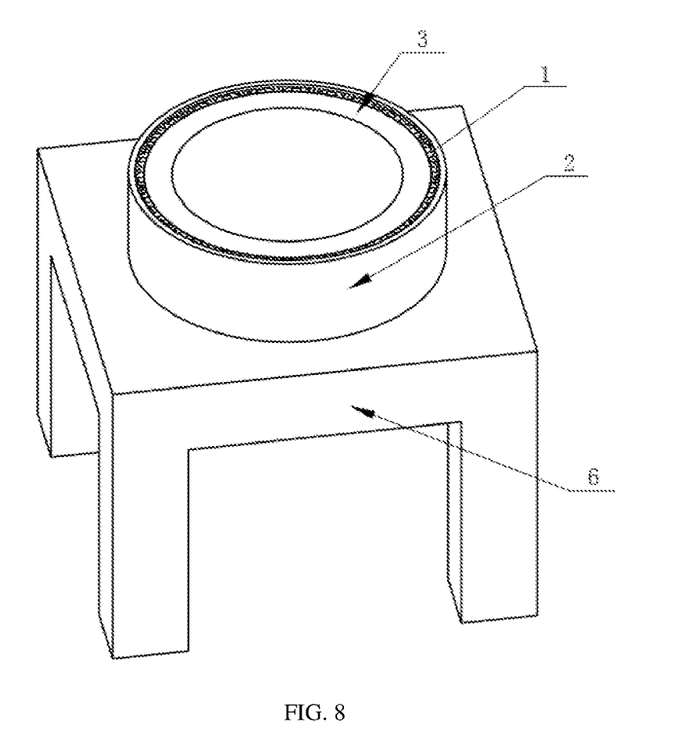
FIG. 8 is a structural schematic diagram of an extrusion table and a Halbach magnetic ring component according to an embodiment of the present disclosure.

Specifically, when the positioning cylinder 3 is taken out, the positioning cylinder 3 and the preliminarily formed Halbach magnetic ring component are placed on an extrusion table 6, and an external force is applied to the upper end of the positioning cylinder 3 to push out the positioning cylinder 3. Optionally, the extrusion table 6 comprises support legs and a platform provided on the support legs. A through hole is provided in the middle of the platform, and the diameter of the through hole is larger than that of the positioning cylinder 3. When the positioning cylinder 3 and the preliminarily formed Halbach magnetic ring component are placed on the extrusion table 6, the positioning cylinder 3 corresponds to the position of the through hole. A vertical downward force is applied from the upper end of the positioning cylinder 3 to push out the positioning cylinder 3 to obtain the cured Halbach magnetic ring component.

It is checked whether the polarity of magnetic shoe 1 is correct and the dimensional tolerance is in conformity after obtaining the cured Halbach magnetic ring component.

According to the present disclosure, a circular Halbach magnetic ring component is finally obtained, which comprises an aluminum ring 2 and 104 magnetic shoes 1 arranged in the inner ring of the aluminum ring 2 in the form of a Halbach magnetic circuit array.

Preferably, the sleeve 4 is a POM sleeve, and POM material has certain elasticity compared with metal material, which can ensure the dimensional accuracy and make it easier to fasten the magnetic shoe 1.

Figure 10:
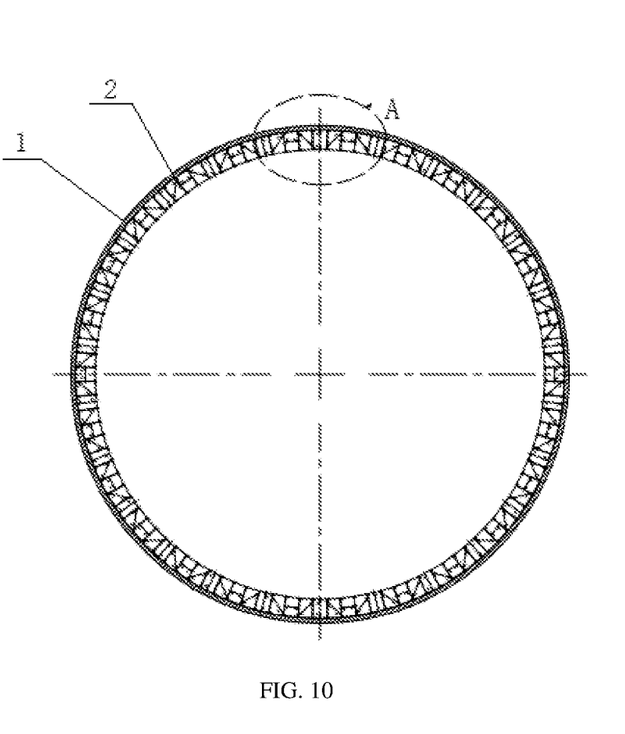
FIG. 10 is a top view of a Halbach magnetic ring component according to an embodiment of the present disclosure.
Figure 11:
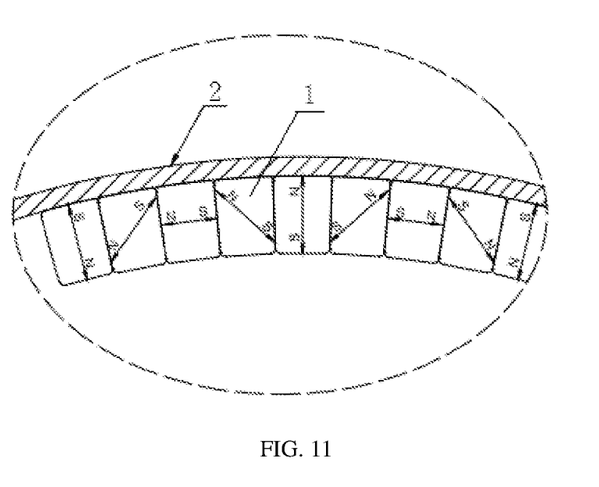
FIG. 11 is an enlarged view at A.

Combining with the above embodiments, the assembly process of the Halbach magnetic ring component is specifically explained. In the assembly process, the following steps are included:

sequentially adsorbing a plurality of magnetic shoes 1 marked with polarity directions on the outer surface of the positioning cylinder 3, wherein each magnetic shoe 1 is adsorbed on the outer surface of the positioning cylinder 3 in the form of a Halbach magnetic circuit array and forms a circular ring, and it is ensured that the length extension direction of the magnetic shoes 1 is consistent with the axial direction of the positioning cylinder 3 by using a stainless steel positioning plate 5 in the adsorption process;

after all the magnetic shoes 1 are arranged and adsorbed on the low carbon steel positioning cylinder 3, checking whether the polarity of the magnetic shoes 1 is correct;

pressing the sleeve 4 from above the circular ring formed by each magnetic shoe 1 to be sleeved on the outer surface of each magnetic shoe 1 so as to to fasten the magnetic shoe 1;

moving the sleeve 4 downwards so that the upper part of each magnetic shoe 1 is exposed;

performing first dispensing on the exposed part of the upper part of each magnetic shoe 1, wherein the glue adopts anaerobic structural adhesive;

sleeving the aluminum ring 2 on the upper area of each magnetic shoe 1 where dispensing has been performed, so that the aluminum ring 2 covers the first dispensing area 7 of each magnetic shoe 1, and the upper end face of the aluminum ring 2 is higher than that of the magnetic shoe 1;

continuing to move the sleeve 4 downwards until the sleeve 4 is completely separated from the magnetic shoe 1;

performing second dispensing on the remaining exposing area of the lower part of the magnetic shoe 1, wherein the glue adopts anaerobic structural adhesive;

moving the aluminum ring 2 downwards until the aluminum ring 2 is completely sleeved on the outer surface of each magnetic shoe 1, wherein the upper end face of the aluminum ring 2 is flush with the upper end face of the magnetic shoe 1, and the low end face of the aluminum ring 2 is flush with the lower end face of the magnetic shoe 1 to obtain a preliminarily formed Halbach magnetic ring component;

standing for 24 hours until the glue is completely cured;

placing the positioning cylinder 3 and the Halbach magnetic ring component on an extrusion table 6, and applying a vertical downward force to the low carbon steel positioning cylinder 3 from the upper end of the low carbon steel positioning cylinder 3 until the low carbon steel position cylinder 3 is pushed out to separate the positioning cylinder 3 from the Halbach magnetic ring component;

removing the residual glue, and checking whether the polarity of magnet is correct and whether the dimensional tolerance is in conformity.

assembling according to the above assembly process, wherein the finally obtained Halbach magnetic ring component is circular, as shown in FIGS. 9-11, which comprises an aluminum ring 2 and 104 sintered NdFeB magnetic shoes, and the 104 sintered NdFeB magnetic shoes are sequentially dispensed and placed in the inner ring of the aluminum ring 2 in the form of a Halbach magnetic circuit array.

In this manner, using a positioning cylinder 3, a sleeve 4 and a stainless steel positioning plate 5, the problems are solved that the magnetic shoe is not closely arranged, easy to reverse, low in assembly efficiency, low in finished product accuracy and low in qualified rate due to the lack of supports adsorbing the magnetic shoe 1 when the Halbach magnetic ring is assembled.

It can be understood that the same or similar parts in the above embodiments can be referred to each other, and the contents not described in detail in some embodiments can be referred to the same or similar contents in other embodiments. The plurality of schemes according to the present disclosure comprise their own basic schemes, which are independent of each other and do not restrict each other, but they can also be combined with each other without conflict, so as to achieve the common realization of multiple effects.

The above is only a specific embodiment of the present disclosure, but the protection scope of the present disclosure is not limited thereto. Any changes or substitutions conceivable to those skilled in the art within the technical scope disclosed by the present disclosure should be covered within the protection scope of the present disclosure. Therefore, the protection scope of the present disclosure shall be subject to the protection scope of the claims.

What is claimed is:

1. An assembly process of a Halbach magnetic ring component, comprising:
    sequentially adsorbing a plurality of magnetic shoes (1) marked with polarity directions on an outer surface of a positioning cylinder (3), wherein each magnetic shoe (1) is adsorbed on the outer surface of the positioning cylinder (3) with polarity in the form of a Halbach magnetic circuit array and forms a circular ring;
    sleeving a sleeve (4) on an outer surface of a circular ring formed by each magnetic shoe (1) so as to fasten each magnetic shoe (1);
    moving the sleeve (4) downwards so that an upper part of each magnetic shoe (1) is exposed;
    performing a first dispensing on the exposed part of the upper part of each magnetic shoe (1);
    sleeving an aluminum ring (2) on the outer surface of the upper part of the circular ring formed by each magnetic shoe (1), so that the aluminum ring (2) covers the first dispensing area (7) of each magnetic shoe (1), and an upper end face of the aluminum ring (2) is higher than that of each magnetic shoe (1);
    moving the sleeve (4) downwards until the sleeve (4) is completely separated from each magnetic shoe (1), and performing a second dispensing on the exposed part of the lower part of each magnetic shoe (1);
    moving the aluminum ring (2) downwards until the aluminum ring (2) is completely sleeved on the outer surface of each magnetic shoe (1), wherein the upper end face of the aluminum ring (2) is flush with an upper end face of the magnetic shoe (1), and the low end face of the aluminum ring (2) is flush with a lower end face of each magnetic shoe (1) to obtain a preliminarily formed Halbach magnetic ring component; and
    taking out the positioning cylinder (3) to obtain the cured Halbach magnetic ring component.

2. The assembly process of the Halbach magnetic ring component according to claim 1, wherein when each magnetic shoe (1) is adsorbed on the outer surface of the positioning cylinder (3), a stainless steel positioning plate (5) is used to ensure that a length direction of the magnetic shoe (1) is consistent with an axial direction of the positioning cylinder (3), the stainless steel positioning plate (5) has an arc structure and an inner diameter matched with an outer diameter of the positioning cylinder (3), the stainless steel positioning plate (5) comprises a reference surface (51), when the stainless steel positioning plate (5) is attached to the outer surface of the positioning cylinder (3), a length extension direction of the reference surface (51) is consistent with the axial direction of the positioning cylinder (3), and the stainless steel positioning plate (5) is attached to the positioning cylinder (3) so that the magnetic shoe (1) is adsorbed on the positioning cylinder (3) against the reference surface (51).

3. The assembly process of the Halbach magnetic ring component according to claim 1, wherein prior to the first dispensing, the sleeve (4) moves downwards until the upper end face of the sleeve (4) is located in a middle of the magnetic shoe (1), and then the first dispensing is performed on the exposed part of the upper part of each magnetic shoe (1); before a glue of the first dispensing is cured, the second dispensing is performed on the exposed part of the lower part of each magnetic shoe (1).

4. The assembly process of the Halbach magnetic ring component according to claim 1, wherein prior to taking out the positioning cylinder (3), the preliminarily formed Halbach magnetic ring component is allowed to stand for 24 hours, and the positioning cylinder (3) is taken out after a dispensing glue is completely cured, so that the positioning cylinder (3) is separated from the Halbach magnetic ring component.

5. The assembly process of the Halbach magnetic ring component according to claim 1, wherein when the positioning cylinder (3) is taken out, the positioning cylinder (3) and the preliminarily formed Halbach magnetic ring component are placed on an extrusion table (6), and an external force is applied to an upper end of the positioning cylinder (3) to push out the positioning cylinder (3).

6. The assembly process of the Halbach magnetic ring component according to claim 1, wherein the positioning cylinder (3) is made of low carbon steel.

7. The assembly process of the Halbach magnetic ring component according to claim 1, wherein the sleeve (4) is a polyoxymethylene (POM) sleeve.

8. The assembly process of Halbach magnetic ring component according to claim 1, wherein a glue used for dispensing is an anaerobic structural adhesive.

9. The assembly process of the Halbach magnetic ring component according to claim 1, wherein the number of the magnetic shoes (1) is 104, and the magnetic shoe (1) is a sintered NdFeB magnetic shoe.

10. The assembly process of the Halbach magnetic ring component according to claim 1, wherein the outer diameter of the positioning cylinder (3) is the same as an inner diameter of the Halbach magnetic ring component, and the inner diameter of the sleeve (4) is matched with an outer diameter of the magnetic shoe (1).

* * * * *